(12) United States Patent
Atkinson et al.

(10) Patent No.: US 6,226,121 B1
(45) Date of Patent: May 1, 2001

(54) OPTICAL TELESCOPE SYSTEM WITH DISCONTINUOUS PUPIL CORRECTOR AND SEGMENTED PRIMARY MIRROR WITH SPHERICAL SEGMENTS

(75) Inventors: Charles B. Atkinson, Redondo Beach; Nelson W. Wallace, Woodland Hills; James E. Klein, Glendale, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/526,759

(22) Filed: Mar. 16, 2000

(51) Int. Cl.$^7$ .................................................. G02B 23/00
(52) U.S. Cl. .................... 359/399; 359/853; 359/859; 359/366; 343/915
(58) Field of Search .................... 359/399, 851, 359/853, 857, 859, 364, 366; 343/915

(56) References Cited

U.S. PATENT DOCUMENTS

| | | | |
|---|---|---|---|
| 4,811,034 | 3/1989 | Kaminskas | 343/915 |
| 5,291,333 | * | 3/1994 | Mills et al. ............ 359/601 |
| 5,898,529 | 4/1999 | Meyer et al. ............ 359/853 |

* cited by examiner

Primary Examiner—Cassandra Spyrou
Assistant Examiner—Mark A. Robinson
(74) Attorney, Agent, or Firm—Michael S. Yatsko

(57) ABSTRACT

A large, low cost and high quality optical telescope system (1) includes a segmented primary mirror (2) having a plurality of spherical mirror segments (3) arranged in a non-spherical shape (4), a parabolic shape in the disclosed embodiment, so that the rays incident upon the individual spherical mirror segments stay separated at an exit pupil (5) of the system, allowing for correction of aberrations. A discontinuous pupil corrector in the form of a segmented mirror (7) having a plurality of aspheric correction terms in it, is located at the exit pupil for correction of aberrations introduced from respective ones of the plurality of spherical mirror segments of the primary mirror. The discontinuous pupil corrector preferably is a segmented deformable mirror. The telescope system and related method can achieve diffraction limited performance for very large systems. The disclosed embodiment is a 35 meter aperture, deployable space telescope system. Inexpensive replication techniques can be used for making the spherical primary mirror segments.

16 Claims, 8 Drawing Sheets

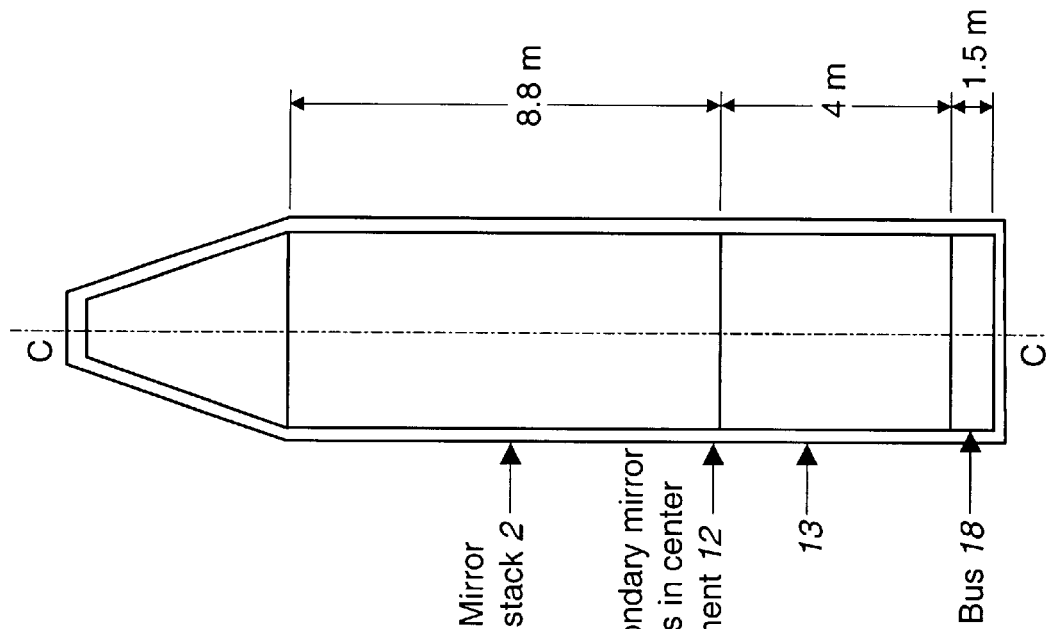
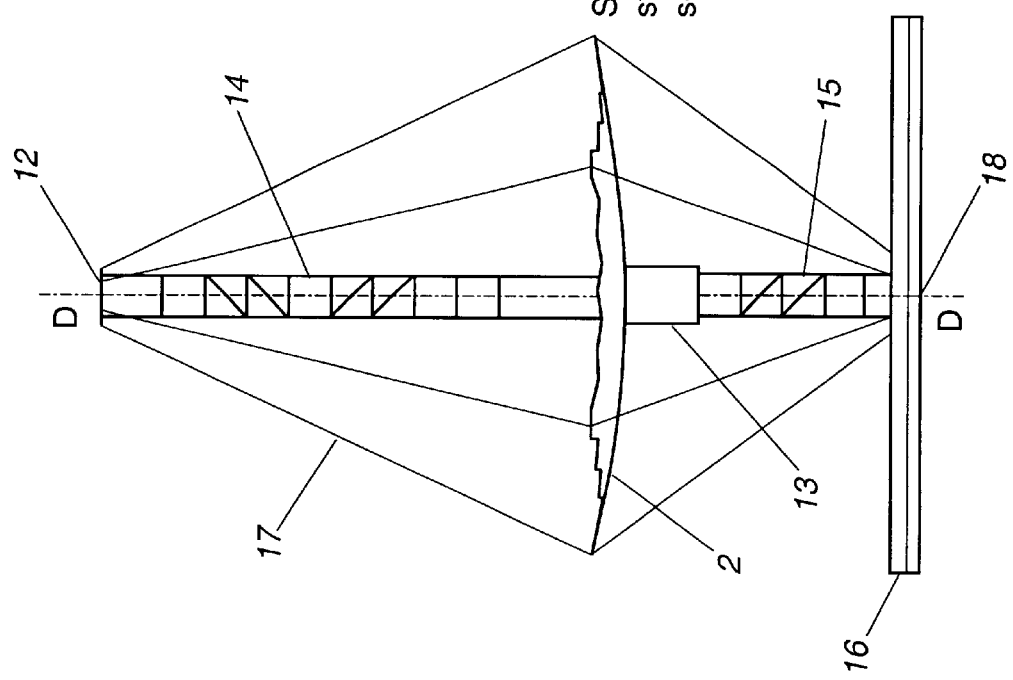

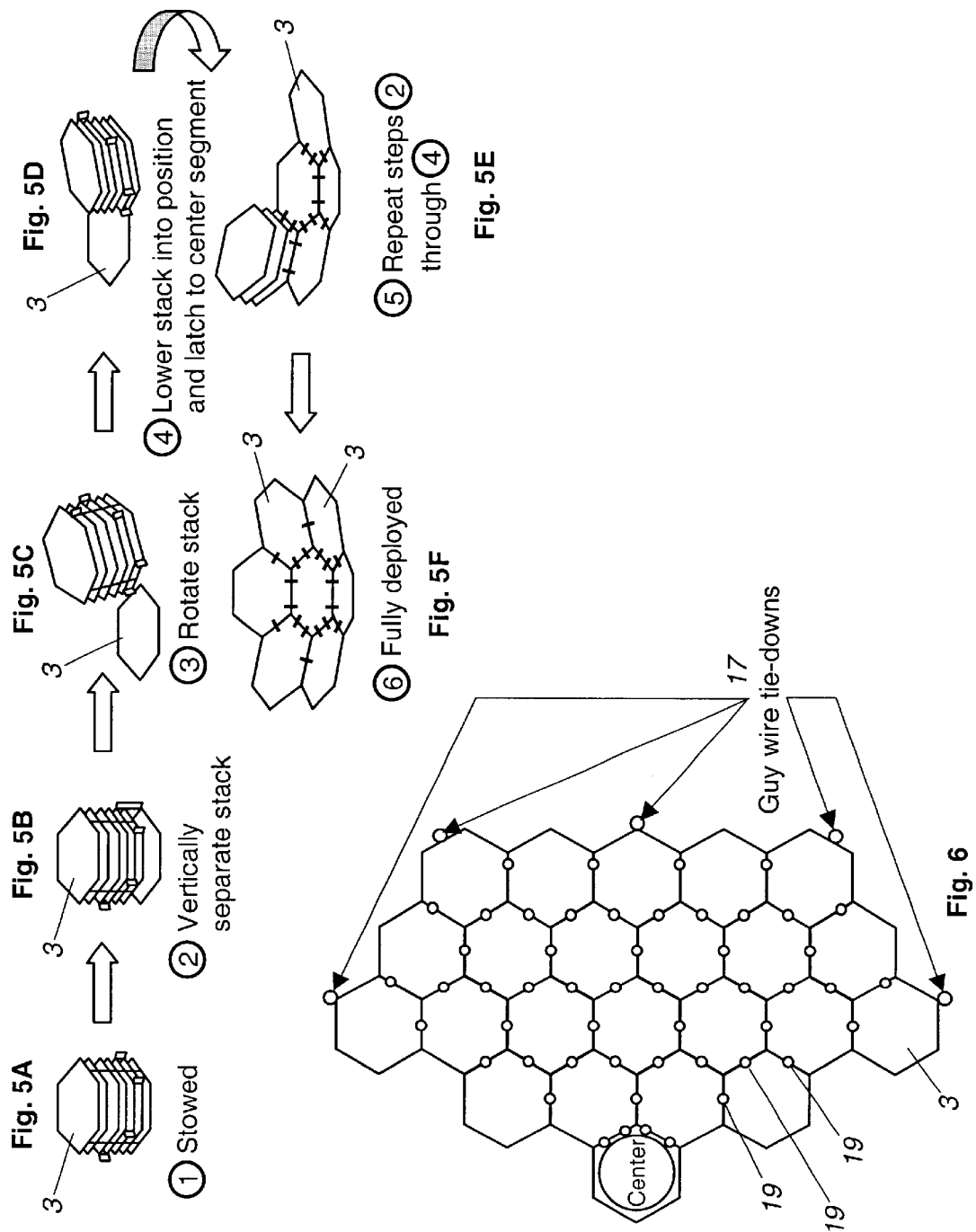

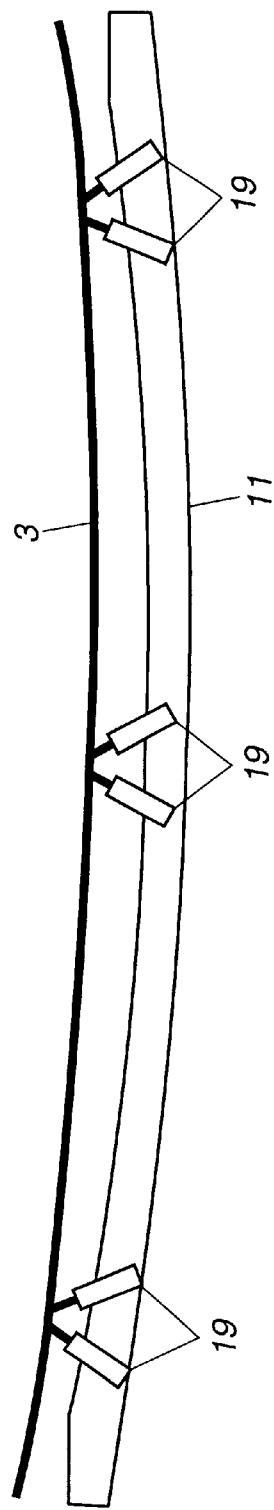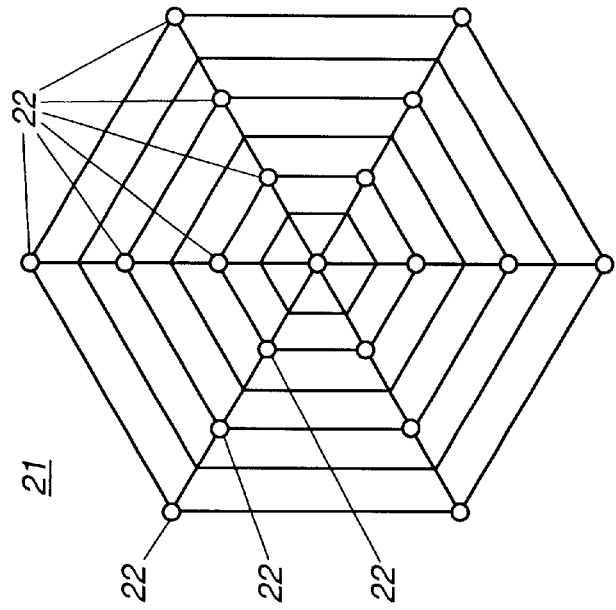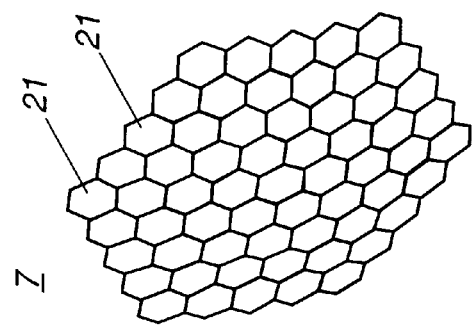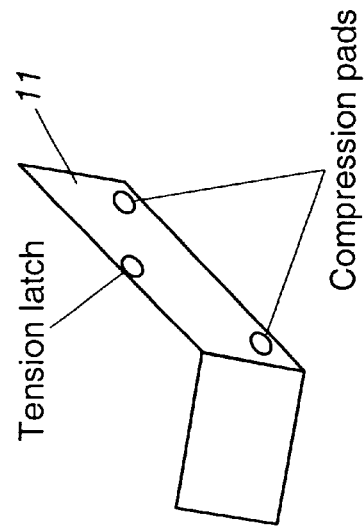
Fig. 12
Fig. 13
Fig. 14
Fig. 15

OPTICAL TELESCOPE SYSTEM WITH DISCONTINUOUS PUPIL CORRECTOR AND SEGMENTED PRIMARY MIRROR WITH SPHERICAL SEGMENTS

TECHNICAL FIELD

A low cost, large aperture optical telescope system and method for obtaining diffraction limited optical performance are disclosed. In a preferred embodiment, the system is a deployable, space optical telescope system.

BACKGROUND AND SUMMARY

A segmented spherical primary mirror is an ideal candidate for a low-cost, large aperture optical telescope system. The use of inexpensive replication techniques for the segmented spherical mirror makes the system affordable. However, this results in a system that traditionally does not perform well, especially over a field of view. The Hobby-Eberly telescope system is an example of such a system.

Most well-corrected optical telescope systems use a primary mirror that has a parabolic or nearly-parabolic shape. A method that has been used recently in these systems to correct for aberrations in the pupil involves placing a deformable mirror at the exit pupil. The shape of the deformable mirror is changed via actuators behind a membrane optical surface. The problem is that for a continuous spherical primary mirror, the optical rays become unseparable at the pupil location. A deformable mirror at this location cannot correct aberrations introduced from a spherical primary mirror. Moreover, the pupil mirror does not correct for the discontinuity resulting from adjacent edges of a segmented mirror.

Increased interest in generating larger and larger optical telescopes for space and ground observatories points to the need for an improved, low-cost and high quality, optical telescope system. The present invention addresses this need. To this end, an optical telescope system according to the invention comprises a segmented primary mirror having a plurality of spherical mirror segments arranged in a non-spherical shape so that the rays incident upon the individual spherical mirror segments stay separated at an exit pupil of the telescope system, allowing for correction of aberrations. A discontinuous pupil corrector is located at the exit pupil of the telescope system. The discontinuous pupil corrector comprises a segmented mirror having a plurality of aspheric correction terms in it for correction of aberrations introduced from respective ones of the plurality of spherical mirror segments of the segmented primary mirror. In a disclosed, preferred embodiment of the invention, the system is a deployable, space optical telescope system.

A method of obtaining diffraction limited optical performance in a large aperture optical telescope system according to the invention comprises the steps of: providing a large aperture optical telescope system having a segmented primary mirror with a plurality of spherical mirror segments tilted and positioned to form a non-spherical shape so that rays incident upon the individual spherical segments stay separated at an exit pupil of the telescope system, allowing for correction of aberrations; reflecting rays incident upon the individual spherical segments of the primary mirror to the exit pupil of the telescope system; and correcting aberrations introduced into the reflected rays from respective ones of the plurality of spherical mirror segments of the primary mirror at the exit pupil of the telescope system using a discontinuous pupil corrector comprising a segmented mirror at the exit pupil having a plurality of aspheric correction terms in it in respective segments of the discontinuous pupil corrector mirror. The segmented mirror of the discontinuous pupil corrector in the disclosed embodiment preferably is a segmented deformable mirror.

The optical telescope system and method of the invention can achieve diffraction limited performance for very large systems while allowing inexpensive replication techniques to be used for making segments of the primary mirror. These and other objects, features and advantages of the present invention will become more apparent from the following detailed description of the invention, including a preferred embodiment thereof.

BRIEF DESCRIPTION OF THE DRAWINGS

FIG. 3 is a side view of the telescope system of FIG. 2 in a deployed position on a spacecraft on which the telescope system is mounted.

FIG. 4 is a cross-sectional view through the central longitudinal axis C—C of a fairing containing the telescope system of FIGS. 2 and 3 in its stowed position for launching into space.

FIGS. 5A–5E are respective views of some of the segments of the primary mirror of the telescope system of FIGS. 2–4 stacked in their stowed position (FIG. 5A) of the telescope system and in successive stages of deployment by repeated rotation and translation motions to position the deployable segments around the fixed center segment.

FIG. 6 is a front view in the direction D—D in FIG. 3 showing a portion of a 60-segment system with hexagonal, spherical segments of the primary mirror of the telescope system in its deployed position with an arrangement of guy wire tie-downs about the mirror.

FIG. 12 is a side view of an exemplary segment of the segmented primary mirror of the telescope system of the invention showing the segment supported on a reaction structure of the mirror by way of actuators arranged in a hexapod, three pairs of bi-pods, for rigid body motion adjustment of the segment to allow the segments of the mirror to be phased with respect to each other.

FIG. 13 is a schematic illustration of a mirror segment reaction structure of the primary mirror in tension at the top and compression at the bottom.

FIG. 14 is a schematic illustration of a discontinuous pupil corrector at the exit pupil of the telescope system of the invention, the corrector being in the form of a segmented mirror having a plurality of a spheric correction terms in it for correction of aberrations introduced from respective ones of the plurality of spherical mirror segments of the segmented primary mirror of the system. The pupil corrector's segments are of the same shape, in scale, of the primary mirror segments.

FIG. 15 is an illustration of an actuator location map.

DETAILED DESCRIPTION OF DISCLOSED EMBODIMENT

Figure 1A:
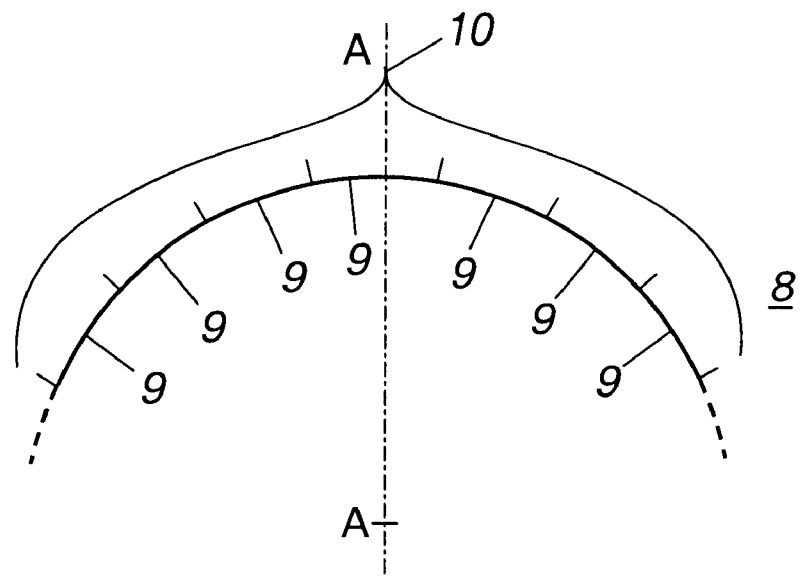
FIG. 1A is a schematic illustration of a segmented spherical mirror as seen in a cross-section along a central longitudinal axis A—A of the mirror.
Figure 1B:
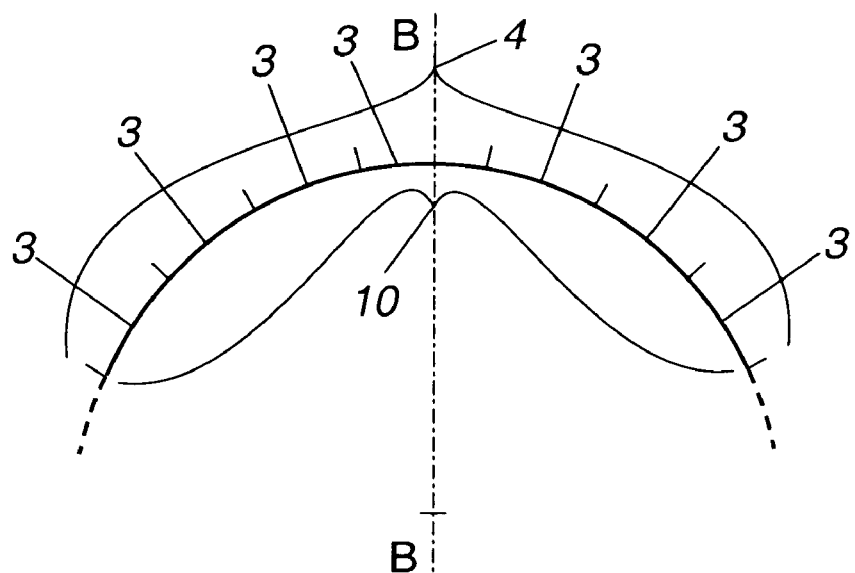
FIG. 1B is a schematic illustration of a segmented primary mirror, as seen in a cross-section along a central longitudinal axis B—B of the mirror, of an optical telescope system according to an embodiment of the invention, wherein spherical mirror segments like those in FIG. 1A are arranged in a non-spherical shape.
Figure 2:
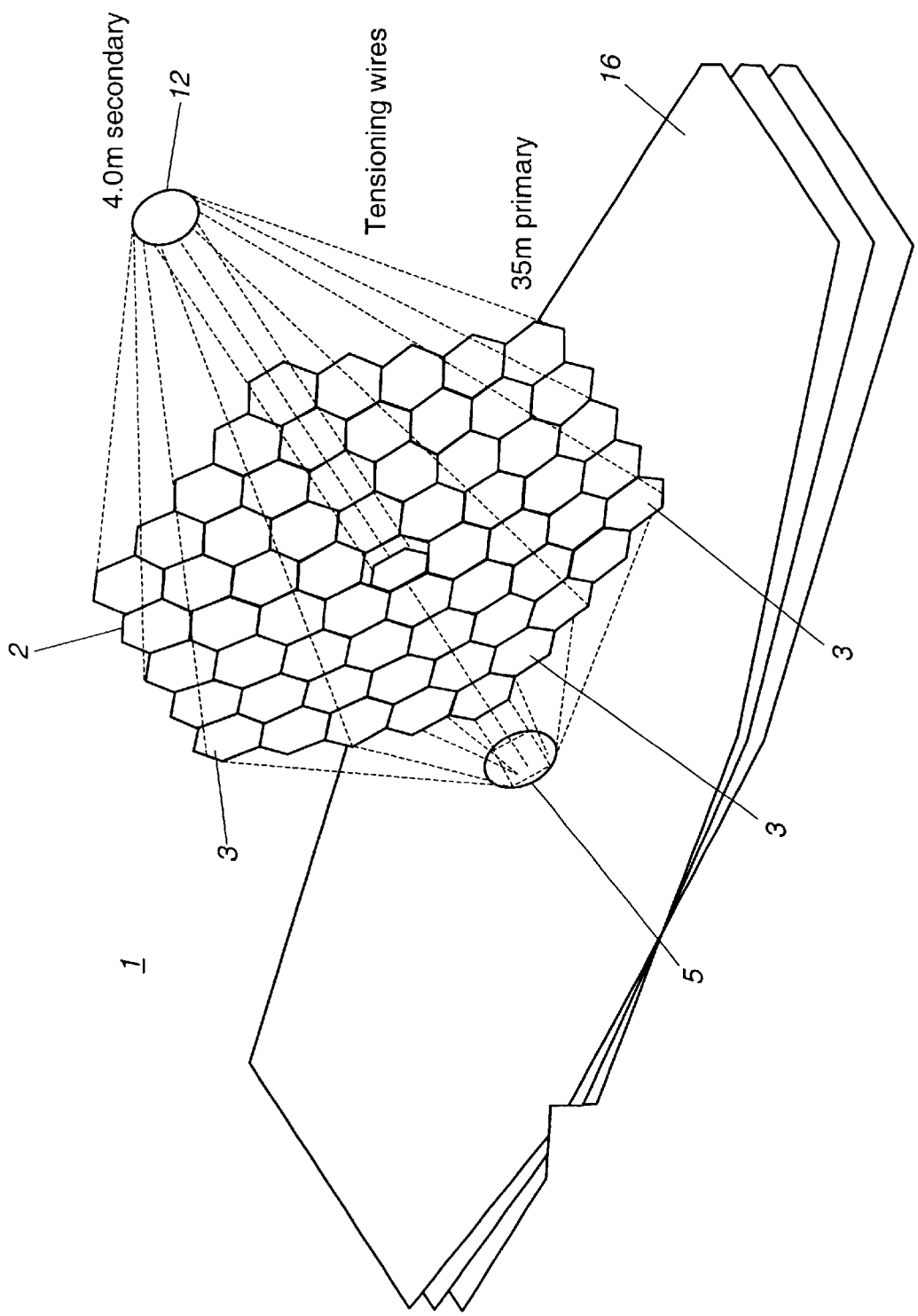
FIG. 2 is a perspective view to one side and above a deployable, space optical telescope system according to a preferred embodiment of the invention, the primary mirror of the system being constructed of spherical mirror segments arranged in a non-spherical shape as shown schematically in FIG. 1B.

Referring now to FIGS. 1B and 2 of the drawings, the optical telescope system (1) in the disclosed embodiment is a large aperture, deployable space telescope system comprising a segmented primary mirror (2) having a plurality of spherical mirror segments (3) arranged in a non-spherical shape (4), particularly a parabolic or hyperbolic shape as shown in FIG. 1B, so that the rays incident upon the individual spherical mirror segments (3) stay separated at an exit pupil (5) of the telescope system, allowing for correction of aberrations. A discontinuous pupil corrector (6) is located at the exit pupil (5). The pupil corrector is in the form of a segmented mirror (7), see FIG. 14, having a plurality of aspheric correction terms in it for correction of aberrations introduced from respective ones of the plurality of spherical mirror segments (3) of the segmented primary mirror (2).

FIG. 1A is a schematic illustration of a segmented spherical mirror (8), wherein the individual spherical segments (9) of the mirror are arranged in a continuum along the aspheric surface or shape (10) of the mirror. In contrast, as noted above, in the primary mirror (2) of the optical telescope system 1 according to the invention, the spherical mirror segments (3) are arranged in a non-spherical shape (4), as shown in FIG. 1B. The non-spherical shape (4) in the telescope system (1) is preferably a parabolic shape, but another non-spherical shape could be used. By having the primary mirror's spherical segments (3) located as if they are following the contour of a parabola (4), the rays incident upon the individual segments (3) of the primary mirror (2) stay separated at the exit pupil (5), allowing for correction. That is, the primary mirror (2) acts like a parabola, with local wavefront errors across the segments that are spherical in nature.

These errors can be corrected at the exit pupil (5) using the discontinuous pupil corrector (6) of the invention which, as noted above, comprises a segmented mirror (7) which has aspheric correction terms in it. This can be achieved using either a segmented deformable mirror or a segmented mirror that has local aspherical correction on each segment to correct for the subaperture differences between the ideal parabolic surface and the sphere that is used. The optimum correction occurs with a segmented deformable mirror and this is the preferred form of mirror (7). The segmented deformable mirror (7), as shown in FIG. 14, is a scaled image of the primary mirror (2) and corrects for the local spherical aberration induced by each primary mirror segment (3) in a way that a continuous surface deformable mirror cannot. The optical telescope system (1) also allows for rigid body adjustment of each segment (3) of the primary mirror (2) as explained below with reference to FIG. 12, to minimize the segment-to-segment alignment error's effect on the image quality. It also allows for correction of higher order errors.

Proof of concept optical modeling of the improved optical telescope system of the invention has shown that the system can achieve diffraction limited performance for very large systems. By way of example, optical models of various 30 meter telescope systems according to the invention resulted in desirable performance as seen in the following table. Note that diffraction limited performance for 1 micron wavelength is 0.25 micron.

TABLE

| Segment Size | Primary Mirror F/# | Field of View | Design Performance |
|---|---|---|---|
| 2 meters | 3.0 | 0.33 arcmin | 0.014 micron |
| 2 meters | 3.0 | 2 arcmin | 0.086 micron |
| 4.5 meters | 3.0 | 0.33 arcmin | 0.014 micron |
| 4.5 meters | 1.5 | 0.06 arcmin | 0.265 micron |
| 2 meters | 1.5 | 1.0 arcmin | 0.242 micron |

The results of the optical modeling show that a low-cost, diffraction limited performance telescope system according to the invention is viable for wavelengths in the near infrared (5–10 microns), once manufacturing errors have been considered.

The system trade-off is in segment aperture size versus focal length. The larger the segment, the greater the error between the spherical surface and the ideal parabola. As the F/# is increased (slower), this error is mitigated. However, slow primary mirrors require very large distances between the primary and secondary, which creates stability problems. Optical models of a telescope system with an entrance aperture as large as 30 meters (primary mirror diameter) made of spherical segments that are tilted and positioned to form a shape that is representative of a parabolic shape have shown that pupil correction for just the spherical terms can achieve diffraction limited performance at 1 micron over a 2 arcmin field. The performance of the optical telescope system 1 of the illustrated embodiment as discussed further below is consistent with the results of the optical modeling.

Figure 7:
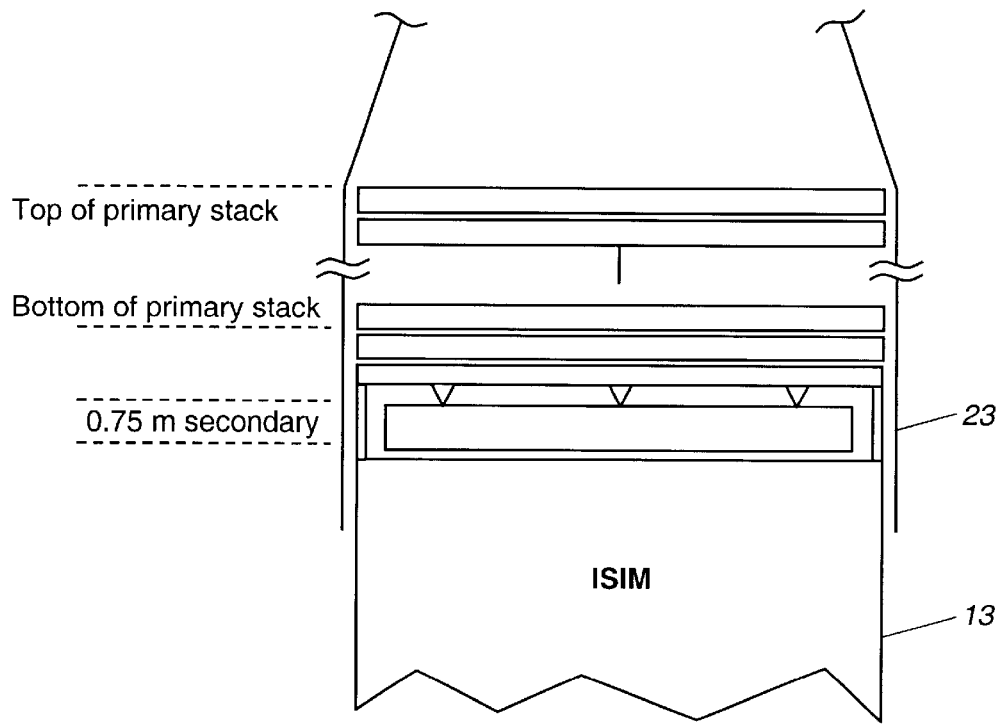
FIG. 7 is a schematic illustration of the stowed telescope system of the disclosed embodiment with the secondary mirror of the telescope system stowed directly on top of the instrument compartment of the system.

The segmented primary mirror 2 of the optical telescope system (1), when deployed, is a stiff primary mirror consisting of 60 hexagonal, spherical mirror segments (3) arranged in four concentric rings, as shown in FIG. 2. The mirror (2) has a circumscribed diameter aperture of 35 meters. In the stowed position of the telescope system (1), see FIGS. 4 and 7, the segments (3) of the primary mirror (2) are vertically stacked one upon the other for stowing in a launch vehicle 5-meter payload fairing dynamic envelope of 4.57 meters. The segments (3) are thin replicated mirrors which are deployed with a lightweight reaction structure (11) for cryogenic operation. From the stowed vertical stack, the hexagonal segments are rotated and translated into position around a fixed center segment to which they are latched. The deployment technology for this purpose is disclosed in assignee's U.S. Pat. No. 4,811,034, which patent is incorporated herein by reference. By way of example, stowing stacked hexagonal segments and deploying the same is illustrated generally in FIGS. 5A–5F, wherein seven rigid hex segments (3) are depicted.

Figure 8:
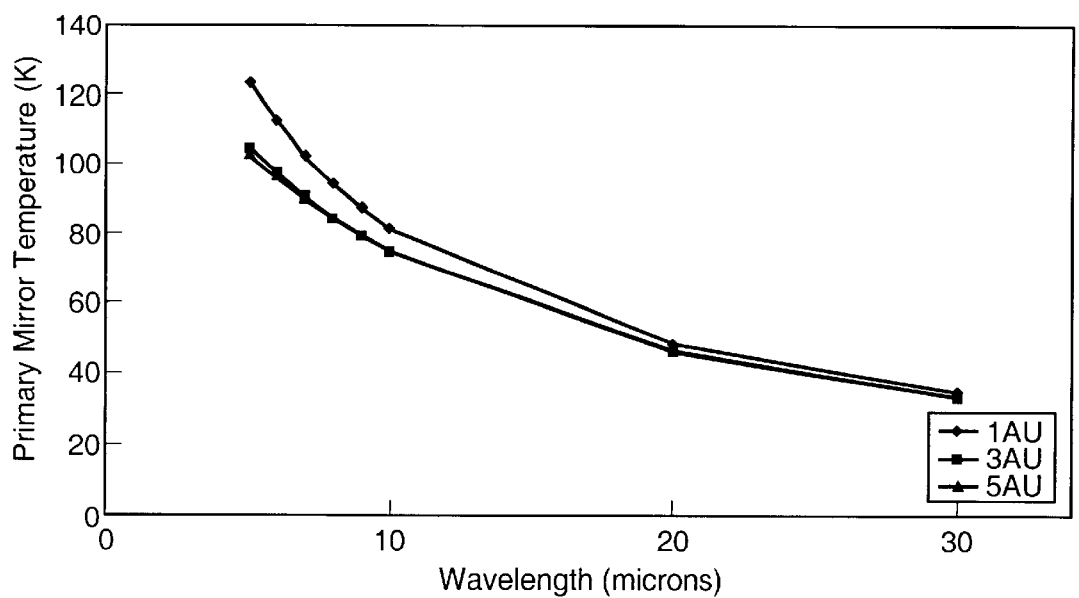
FIG. 8 is a graph showing temperatures where thermal emission of the primary mirror of the telescope system of the invention equals zodiacal light emission for different orbital distances from the sun.

Each hexagonal segment (3) in the primary mirror (2) is 4.5 meters point-to-point allowing it to fit within the 5-meter payload fairing 23 dynamic envelope of 4.57 meters. The secondary mirror (12) of the system (1) is stowed directly on top of the instrument compartment (13) of the system, see FIG. 7, and is deployed from the center of the primary mirror using a deployable mast (14). The entire telescope and instrument compartment are deployed from the spacecraft using a deployable mast (15) as well. A large sunshield (16), preferably 2000–3000 m$^2$, is deployed to passively maintain the instruments at a 30° K operating temperature. An inflatable sunshield can be used. To increase stiffness of the deployed telescope system, (12) guy wires (17) are attached between the outer diameter of the primary mirror (2) and the spacecraft (18), see FIG. 3, and also between the secondary mirror and the outer diameter of the primary mirror. As can be seen in FIG. 8, the primary mirror temperature must be maintained at about 50° K–60° K to preclude its black body radiation from exceeding the background flux. For wavelengths less than 10 microns, the primary mirror temperature can reach 80° K without exceeding the zodiacal flux.

Figure 9A:
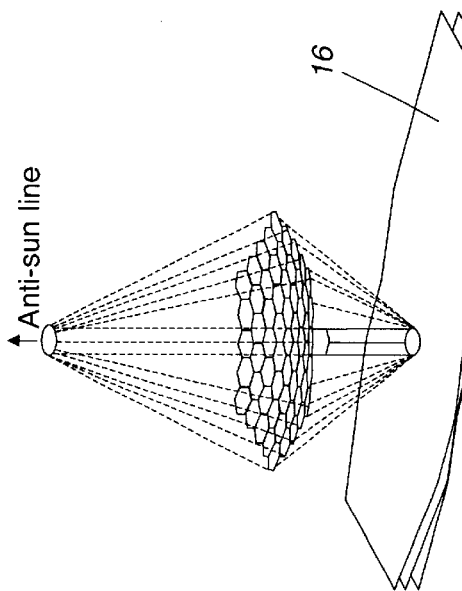
FIGS. 9A and 9B depict the pointing of the telescope system of the invention nominally along the anti-sun direction in side view (FIG. 9B) and in perspective from above and to one side of the system (FIG. 9A).
Figure 9B:
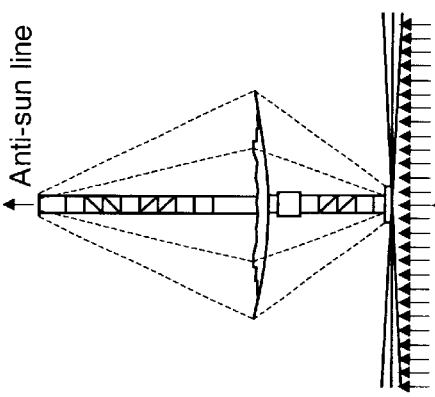
Figure 10A:
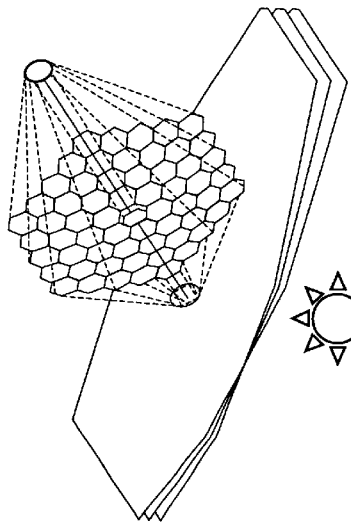
FIGS. 10A and 10B show the pointing of the telescope system of the invention pointed 45 degrees from the anti-sun direction in side view (FIG. 10B) and in perspective from above and to one side of the system (FIG. 10A).
Figure 10B:
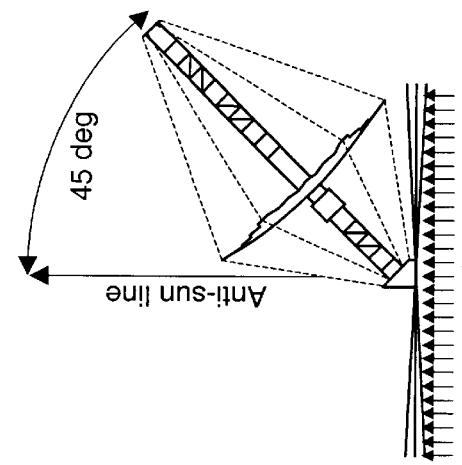
Figure 11:
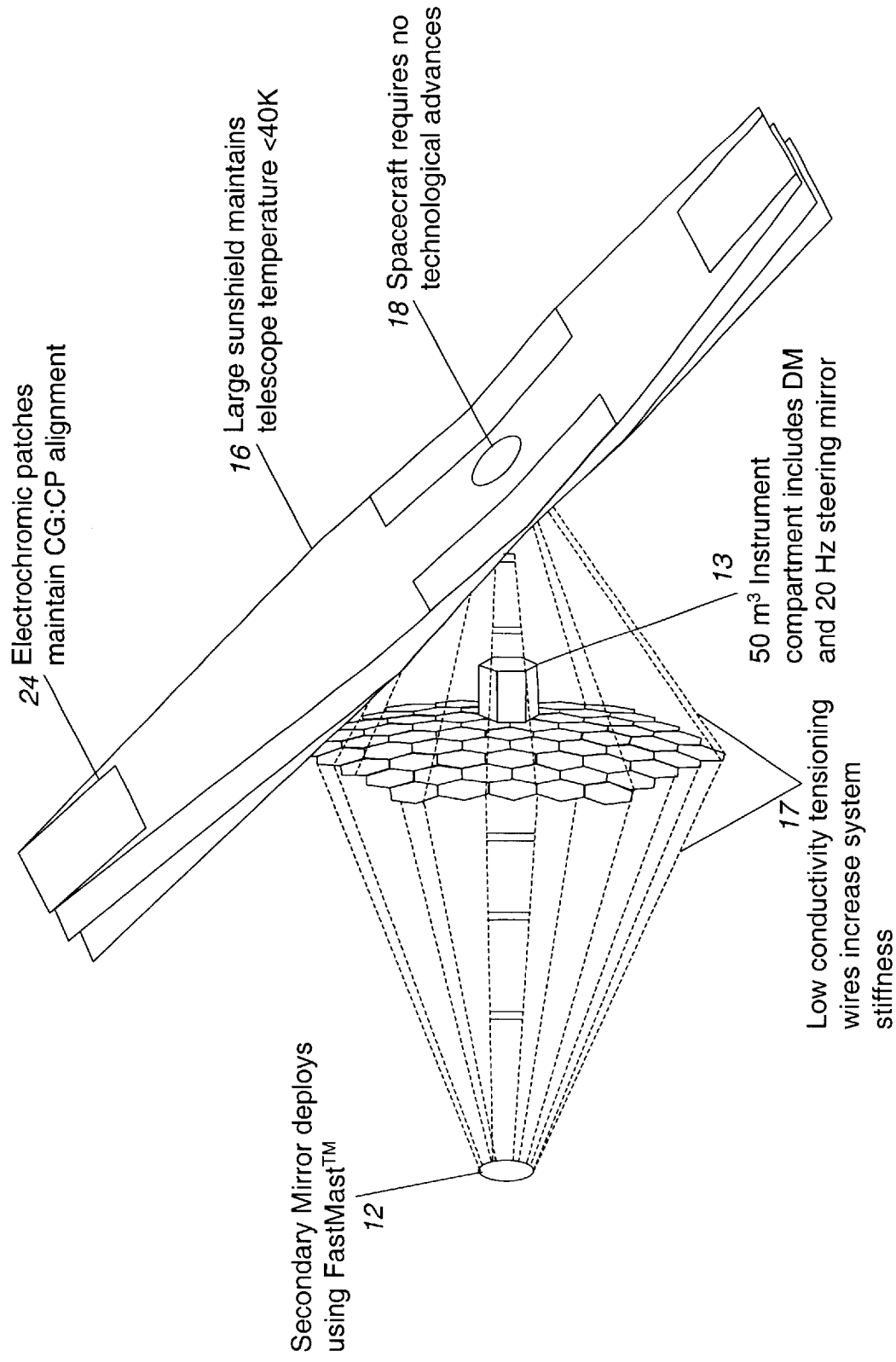
FIG. 11 is a schematic illustration in perspective from one side and below the telescope system of the invention depicting the system architecture embodiment.

As depicted in FIGS. 9A and 9B, pointing of the telescope system (1) is nominally along the anti-sun direction to keep the telescope in the shade of the sunshield (16). By articulating the sunshield at the spacecraft bus interface, the entire telescope can also readily be pointed 45° from the anti-sun direction, as shown in FIGS. 10A and 10B. Pointing to this angle allows observation of the galactic center, and most of the galactic plane. Going to 75° is achievable, allowing observation of the entire galaxy, but would require a much larger sunshield. Electrochromic devices 24, FIG. 11, are mounted on the sunshield to adjust the solar pressure on each wing of the sunshade, thereby compensating for any center of gravity/center of pointing (CG:CP) offset. A steering mirror within the instrument compartment (13) corrects for overall spacecraft pointing errors, as well as secondary mirror line of sight jitter. Using a field splitter at the telescope focus, a 2.5 arcmin by 2.5 arcmin field is sampled for pointing control. It has been calculated that within this field there is a 95% probability of sampling a minimum 18th magnitude star, even at the galactic poles. This allows for 200 Hz sampling and 20 Hz correction of line of sight jitter, well above the natural frequency of the secondary mirror support system.

In the stowed configuration of the telescope system (1) illustrated in FIG. 4, launch restraint longerons, not shown, run up the flat sides of the hexagons, creating a stiff, load-carrying support for the segments. Once deployed, the hexagons are latched in the deployed position, as discussed above. The primary mirror stiffness is increased using the 12 tensioning wires (17) attached to the outer ring, as noted above. The tensioning wires (17), made of Kevlar for low conductivity and low modulus, yet high tensile strength, put the mirror segment reaction structure (11) in tension at the top and compression at the bottom, as shown in FIG. 13, which the latching devices are designed to react. The guy/tensioning wires (17) have a modulus that is significantly less than that of the reaction structure (11) so that they displace under thermal loading, rather than having the primary mirror exhibit strain. The low conductivity is designed to keep spacecraft bus (18) temperatures from reaching the primary mirror. The tensioning wire's small diameter is designed to minimize the impact of the telescope's point spread function. The expected gap between deployed primary mirror segments (3) is 15 mm (5 mm each for physical separation, and edge loss per segment).

The primary mirror (2) is a lightweight mirror having a relatively low areal density, preferably less than 20 kg/m$^2$. Replicated graphite polycyanate is utilized as the primary mirror surface, with each mirror segment (3) being supported on the light weight reaction structure of the primary mirror by 6 actuators (19) in a hexapod configuration as indicated in FIG. 6. The reaction structure (11) is the backbone of the mirror. The reaction structure is made of graphite epoxy (M55J) for high modulus, high conductivity and low coefficient of thermal expansion. Each segment is deployed and latched using the rotation-translation joint and latching mechanism of assignee's U.S. Pat. No. 4,811,034. Latches are placed on each segment such that all mirror segments, except for the outer ring, are joined on all sides. Each innermost ring segment is attached to the center segment at two locations. Every other outer ring segment is additionally supported in the deployed position by the preloaded guy wires.

The secondary mirror (12) of the telescope system (1) has a diameter of 4 meters. In order to avoid the need for figure control on the secondary mirror, the secondary mirror has a more significant areal density, 25 kg/m$^2$ and a 0.75 m thickness for a 6:1 aspect ratio. The instrument compartment (13) of the system (1) houses the back end optics of the telescope, as well as the instrument complement of a single imaging camera and a spectrometer, plus a guide camera. Wavefront sensing is achieved by a phase retrieval.

The tertiary mirror (7) within the instrument compartment (13) volume creates a pupil, allowing for a segmented deformable mirror. This allows most of the distortion correction to occur at the deformable mirror, reducing the need to correct for errors at the primary mirror. Rigid body motion by actuators (19) allow the segments (3) of the primary mirror to be phased with respect to each other. Each segment (21) of the deformable mirror (20) is provided with 19 actuators (22) to correct for low frequency distortions. An actuator location map is shown in FIG. 15. With a reasonable pupil diameter of 235 mm, this requires 5 mm spacing between 1140 actuators.

Detectors for the optical telescope system (1) can be Si:As detectors, for example, for detecting 10–20 microns wavelengths. With the 35 meter aperture and F/9 telescope, the focal plane format is 365 mm$^2$ with critical sampling at 55 microns. Using a mosaic of arrays with a spherical surface is preferred. Currently, available 256×256 arrays of 27 micron size pixels could be used. For a 35 meter aperture, a mosaic of 26×26 of these arrays is required.

While we have shown and described only one embodiment of the present invention herein, it will be readily understood by the skilled artisan that variations of the optical telescope system and method of obtaining diffraction limited optical performance in a large aperture optical telescope system of the invention are possible without departing from the scope of the invention. For example, the large aperture of the optical telescope system can have a circumscribed diameter other than 35 meters. The expression "large aperture" as used herein refers to a telescope system with a segmented primary mirror having a circumscribed diameter in the deployed position of the primary mirror equal to or greater than 4.5 meters. Further, the number and shape of spherical mirror segments arranged in a non-spherical shape in the primary mirror is not limited to 60, as in the disclosed embodiment, or being hexagonal and the segments need not be arranged in four concentric rings. Therefore, we do not wish to be limited to the details shown and described herein, but intend to cover all such changes and modifications as are encompassed by the scope of the appended claims.

We claim:

1. An optical telescope system comprising:
   a segmented primary mirror having a plurality of spherical mirror segments arranged in a non-spherical shape so that the rays incident upon the individual spherical mirror segments stay separated at an exit pupil of said telescope system, allowing for correction of aberrations; and
   a discontinuous pupil corrector located at said exit pupil of said telescope system, said discontinuous pupil corrector comprising a segmented mirror having a plurality of aspheric correction terms in it for correction of aberrations introduced from respective ones of said plurality of spherical mirror segments of said segmented primary mirror.

2. The optical telescope system according to claim 1, wherein said segmented mirror of said discontinuous pupil corrector is a segmented deformable mirror.

3. The optical telescope system according to claim 2, wherein said segmented deformable mirror is a scaled image of said segmented primary mirror and corrects for the local spherical aberration induced by each primary mirror segment.

4. The optical telescope system according to claim 1, wherein said segmented primary mirror includes means for rigid body adjusting of each segment to allow the segments to be phased with respect to each other.

5. The optical telescope system according to claim 1, wherein said segmented mirror of said discontinuous pupil corrector is a segmented mirror having local aspherical correction on each segment.

6. The optical telescope system according to claim 1, wherein said discontinuous pupil corrector achieves pupil correction for telescope system imaging with diffraction limited performance at wavelengths in the visible or infrared.

7. The optical telescope system according to claim 1, wherein said system is a space telescope system.

8. The optical telescope system according to claim 1, wherein said plurality of segments of said primary mirror are arranged in a continuum along the non-spherical surface or shape of the mirror.

9. The optical telescope system according to claim 8, wherein said plurality of spherical segments of said primary mirror include 19 to 60 hexagonal segments.

10. The optical telescope system according to claim 1, further comprising a secondary mirror arranged along an optical path of said system intermediate the primary mirror and said pupil corrector.

11. The optical telescope system according to claim 1, wherein said plurality of spherical mirror segments are arranged in the shape of a parabola.

12. The optical telescope system according to claim 1, wherein said spherical mirror segments of said primary mirror are replicated segments.

13. A deployable, space optical telescope system comprising:
   a segmented primary mirror having a plurality of spherical mirror segments arranged in a stowed position of said telescope system wherein said segments are stacked upon each other and movable from said stowed position to a deployed position of said telescope system wherein said segments are arranged in a non-spherical shape so that the rays incident upon the individual spherical mirror segments stay separated at an exit pupil of said telescope system, allowing for correction of aberrations; and
   a discontinuous pupil corrector arranged at said exit pupil of said telescope system in said deployed position of said telescope system, said pupil corrector comprising a mirror having a plurality of aspheric correction terms in it for correction of aberrations introduced from respective ones of said plurality of spherical mirror segments of said segmented primary mirror.

14. The optical telescope system according to claim 13, wherein said segments of said primary mirror are relatively rigid segments.

15. The optical telescope system according to claim 13, wherein said segments of said primary mirror are supported on a reaction structure by way of nanometer resolution mirror positional actuators operable at cryogenic temperatures with 20 nanometers or better resolution.

16. A method of obtaining diffraction limited optical performance in a large aperture optical telescope system, comprising the steps of:
   providing a large aperture optical telescope system having a segmented primary mirror with a plurality of spherical mirror segments tilted and positioned to form a non-spherical shape so that rays incident upon the individual spherical segments stay separated at an exit pupil of said telescope system, allowing for correction of aberrations;
   reflecting rays incident upon the individual spherical segments of said primary mirror to said exit pupil of said telescope system; and
   correcting aberrations introduced into the reflected rays from respective ones of said plurality of spherical mirror segments of said primary mirror at said exit pupil of said telescope system using a discontinuous pupil corrector comprising a segmented mirror at said exit pupil having a plurality of aspheric correction terms in it in respective segments of said discontinuous pupil corrector mirror.

* * * * *